United States Patent [19]

Lowther et al.

[11] Patent Number: 4,965,052

[45] Date of Patent: Oct. 23, 1990

[54] INTEGRATED PRODUCT GENERATION AND CATALYTIC PRODUCT SYNTHESIS IN AN ENGINE-REACTOR

[75] Inventors: Frank E. Lowther, Plano; William M. Bohon, Carrollton, both of Tex.

[73] Assignee: Atlantic Richfield Company, Los Angeles, Calif.

[21] Appl. No.: 116,191

[22] Filed: Nov. 3, 1987

[51] Int. Cl.⁵ .............................................. F02B 65/00
[52] U.S. Cl. .................................... 422/187; 48/198.8; 48/DIG. 8; 123/1 A; 123/3; 123/527
[58] Field of Search .............. 422/148, 187; 123/1 A, 123/3, 527; 48/196 A, DIG. 8

[56] References Cited

U.S. PATENT DOCUMENTS

| | | | |
|---|---|---|---|
| 1,939,018 | 12/1933 | Odell | 568/475 |
| 2,748,179 | 5/1956 | Retailliau | 585/322 |
| 2,814,551 | 11/1957 | Broeze et al. | 48/DIG. 8 X |
| 2,823,243 | 2/1958 | Robinson | 585/322 |
| 2,838,034 | 6/1958 | Clark | 123/1 A |
| 2,846,297 | 8/1958 | Herwig | 48/DIG. 8 X |
| 2,927,006 | 3/1960 | Brooks | 422/131 |
| 3,928,961 | 12/1975 | Pfefferle | 60/39.06 |
| 4,048,250 | 9/1977 | Garwood et al. | 518/704 |
| 4,288,406 | 9/1981 | Sims, Jr. | 422/187 X |
| 4,570,028 | 2/1986 | Voelz et al. | 585/540 |

OTHER PUBLICATIONS

Karim, et al., *J. on the Inst. of Fuel,* 36, pp. 98–105, (Mar. 1963).

Primary Examiner—Robert J. Warden
Assistant Examiner—Jill Johnston
Attorney, Agent, or Firm—Drude Faulconer

[57] ABSTRACT

A process of synthesizing an end product within an integrated engine-reactor wherein an initial product, e.g., syngas, is generated within a first chamber of the engine-reactor. This product is contacted with a catalyst in a second chamber within the engine-reactor to catalytically synthesize an end product, e.g., methanol, which is then expanded within the engine-reactor to rapidly cool the end product before it is exhausted from the engine-reactor.

6 Claims, 4 Drawing Sheets

INTEGRATED PRODUCT GENERATION AND CATALYTIC PRODUCT SYNTHESIS IN AN ENGINE-REACTOR

DESCRIPTION

1. Technical Field

The present invention relates to product synthesis carried out in an engine-reactor and more particularly relates to an integral process of product generation and catalytic product synthesis carried out in an engine-reactor.

2. Background Art

An "engine-reactor", as used herein, refers to an engine which is operated primarily to carry out a chemical reaction rather to produce power as is normally the case. That is, reactants, e.g., hydrocarbons and oxygen, are combined and reacted within the engine to produce an "exhaust" which is rich in a desired product. One such known process involves the conversion of light hydrocarbons (e.g., natural gas) to synthesis gas which is comprised of carbon monoxide and hydrogen and is commonly called "syngas". Conventionally, syngas is generated in a steam reformer which is a high-temperature, highpressure catalytic reactor. Regardless of the ultimate end product (e.g., methanol) to be catalytically synthesized from the generated syngas, the steam reformer represents about 70 percent of the total capital cost of the overall process. By substituting an engine-reactor for the steam reformer, these capital costs may be substantially reduced.

In addition to syngas generation, engine-reactors have been proposed for carrying out a variety of other chemical reactions. The earliest known of these is the process disclosed in U.S. Pat. No. 1,939,018 wherein a hydrocarbon, e.g., methane, is combined with an oxidizer (e.g., air) in amounts less than that required for complete combustion to thereby provide an exhaust rich in aldehydes, alcohols, or other oxygenated products. A promoter and/or a catalyst (e.g., nitrogen dioxide, nitric acid, or a finely divided metal oxide) may be added to the fuel/oxidizer mixture prior to combustion to aid in the reaction and/or to increase the product yield from the process. Further, some of the cylinders of the reciprocating, internal combustion engine-reactor may be operated for power to operate the engine-reactor while other cylinders within the engine are used to carry out the desired chemical reaction.

Another early process using an engine-reactor is disclosed in U.S. Pat. No. 2,748,179 wherein an "unfired" reciprocating engine is used as a compressor to convert low molecular weight hydrocarbons into syngas and other compounds such as olefins and aromatics. The generated synthesis gas can then be converted into a high octane motor fuel by passing the product from the engine reactor through a catalyst after the syngas is exhausted from the engine-reactor.

Still another use of an engine-reactor is discussed in "The Production of Synthesis Gas and Power in a Compression Ignition Engine", Karim and Moore, Journal of the Institute of Fuel, vol 36., March 1963. In the process disclosed therein, natural gas and oxygen-enriched air are supplied to the single cylinder of a four-cycle, open-chamber, compressionignition ignition engine. A small quantity of (pilot) fuel (e.g., diesel) may be injected into the cylinder to ignite the feed mixture to produce an exhaust consisting primarily of hydrogen and carbon monoxide.

Both U.S. Pat. Nos. 4,570,028 and 4,575,383 disclose processes which use an engine-reactor to convert a hydrocarbon gas, e.g., methane, to an acetylene-containing product. In '028, an oxidizing gas is mixed with the methane prior to delivery into the cylinders of the engine-reactor while in '383, the oxidizer gas is injected directly into the cylinders where it is mixed with the methane before combustion. In each of these processes, the "exhaust" product from the engine-reactor is cooled and, in some instances, is then contacted with a catalyst to convert additional methane into the desired end product.

In each of the known processes, an initial product (e.g., syngas) is generated in a cylinder of an engine-reactor which is then reacted with a catalyst to produce a different end product (e.g., methanol). The catalytic reaction is carried out by either injecting a gaseous or powdered catalyst directly into the cylinder during the generation of the initial product, or is brought into contact with the initial product after the initial product has been exhausted from the engine-reactor.

DESCRIPTION OF THE INVENTION

The present invention is a process of synthesizing an end product within an engine-reactor wherein an initial product is generated in a first chamber of the engine-reactor. The initial product is then reacted with a catalyst to synthesize the desired end product in a second chamber of the engine-reactor. The end product is then passed into an expansion chamber to cool the end product by the extraction of work via expansion before the end product is exhausted from the engine-reactor. The expansion chamber may be, but is not necessarily the first chamber in which the initial product was formed.

More specifically, the present invention provides a process of synthesizing an end product by carrying out the entire process in an "integrated" engine-reactor. The engine-reactor may be a modified Otto-cycle engine, Diesel-cycle engine, Stirling-cycle engine, Brayton-cycle engine, or Ericsson-cycle engine, but is not limited to these cycles. The integrated engine-reactor may be based on either reciprocating machinery or rotating machinery, or a combination of both.

In carrying out the present process, a charge of reactants, e.g., methane and oxygen (air), is introduced into the engine-reactor. The reactants are compressed, mixed together (not necessarily in that order), and, within the confines of a first chamber, exploded by either the action of an igniter, by the heat of compression, or by the introduction of a small quantity of pilot fuel. This first reaction (combustion) is non-catalytic, and the chamber in which it occurs is optimized for such, e.g., it has a high volume-to-surface-area ratio so to minimize undesired effects such as quenching of the reaction by the chamber walls. This first reaction produces the initial product; for the reactants methane and oxygen, the initial product is syngas. Subsequently, the initial product is passed out of the first chamber and into a second chamber containing a catalyst(s). This second chamber is optimized for catalysis, e.g., it has a high surface-area-to-volume ratio which is opposite of that of the first chamber. The catalyst in the second chamber catalyzes a reaction forming the desired product from the initial product, e.g., synthesizing methanol from syngas. The hot, compressed end product is then passed out of the second chamber into an expansion chamber, where it is expanded, performing work, and thus cooled thereby quenching the reaction. The expansion chamber may, but not necessarily, be the first chamber in which the original reactants were compressed and exploded. After expansion, the end product is exhausted from the engine-reactor.

In the present process, both initial product generation and catalytic synthesis of an end product from the initial product are carried out in an engine-reactor before the desired end product is exhausted therefrom.

BRIEF DESCRIPTION OF THE DRAWINGS

The actual construction, operation, and apparent advantages of the present invention will be better understood by referring to the drawings in which like numerals identify like parts and in which.

BEST MODES FOR CARRYING OUT THE INVENTION

As discussed above, an engine-reactor has been proposed for carrying out a variety of chemical reactions. One such reaction involves the conversion of light hydrocarbons (e.g., natural gas) to "syngas" (i.e., carbon monoxide and hydrogen).

An engine-reactor generates syngas via incomplete (fuel-rich) combustion. This non-catalytic process occurs most efficiently within a combustion chamber having a high volume-to-surface area ratio. The synthesis of a desired end product, e.g., methanol, from the generated syngas is then carried out by a contacting the syngas with a catalyst. By its nature, catalytic synthesis requires a high surface area-to-volume ratio, the direct opposite of that required for efficient syngas generation.

In the present invention, a process meets both of these two opposing sets of design criteria within the integrated engine-reactor by using multiple, interconnected chambers wherein an initial product (e.g., syngas) is generated in a first chamber having a high volume-to-surface-area ratio and is then passed into a second chamber(s) containing a catalyst(s) having a high surface area-to-volume ratio to thereby synthesize the desired end product. The hot end product is then passed into a chamber having a high volume-to-surface-area ratio and is rapidly cooled by expanding the gas containing the end product while performing mechanical work. The chamber in which the end product is expanded and cooled may be the same chamber in which the initial product (syngas) was generated. In this manner, an end product is catalytically synthesized from initial product (syngas) which is formed non-catalytically from reactants, and wherein both initial and end product formation occur within the integrated engine-reactor.

To better illustrate the present invention, reference will now be made to the drawings in which FIGS. 1A-1F illustrate the present invention as it is carried out in a modified four-stroke Otto engine 10 having cylinder 11 fitted with a modified cylinder head 12. Piston 13 having rod 14 connected to crankshaft 15, is slidably positioned in cylinder 11. The position of piston 12 within the cylinder 11 defines a first or combustion chamber 16 of variable volume. Head 12 is modified to include a second or catalysis chamber 17 of fixed volume. Chamber 17 contains a catalyst having a large surface area, preferably supported on a porous ceramic matrix. Chambers 16 and 17 are fluidly connected together. Head 12 is equipped with an igniter, e.g., sparkplug 18, an intake valve 19 (FIG. 1A) and an exhaust valve 20 (FIG. 1F), both of which may be cam-operated as should be understood in the art.

Figure 1A:
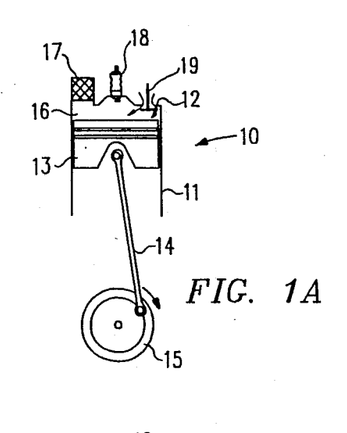
FIGS. 1A-1F are schematical, sectional views of an integrated engine-reactor based on the fourstroke Otto cycle used to carry out the present invention.
Figure 1B:
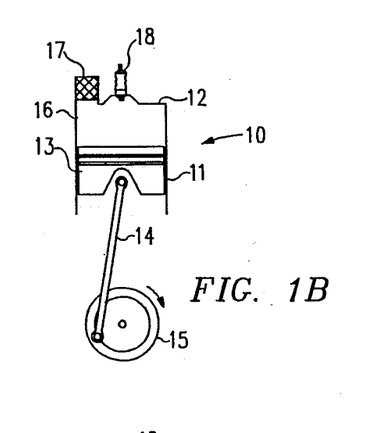

As shown in FIG. 1A, piston 13 has just passed top dead center (TDC) and is moving downward in cylinder 11 towards bottom dead center (BDC). During this action, intake valve 19 is open, allowing a charge of reactants to be drawn into chamber 16. For example, if the initial product is to be syngas, the reactants are a fuel-rich mixture of methane (natural gas) and an oxidant (air). The charge of reactants admitted into chamber 16 may be at a pressure somewhat elevated above atmospheric and there are various methods of providing this supercharge as will be understood in the art. The charge of reactants may also be at a temperature elevated above ambient and there are various methods of providing this preheat as will be understood in the art. The movement of piston 13 from TDC to BDC while intake valve 19 is open is defined to be the "intake" stroke.

At BDC of the intake stroke (FIG. 1B), intake valve 19 closes and crankshaft 15 continues to rotate to move piston 13 upward in cylinder 11 towards TDC thereby compressing the reactants. As the reactants are being compressed, an increasing portion of the reactants is forced from chamber 16 into chamber 17. The volume of chamber 17 remains constant, while the volume of chamber 16 is decreasing during compression.

Figure 1C:
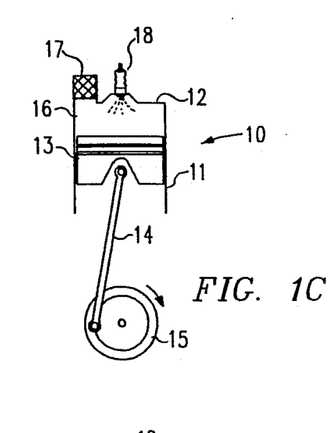

The compressed reactants are ignited by the sparkplug 18 (FIG. 1C). This fuel-rich combustion produces the initial product, e.g., a mixture containing syngas. It is preferred that ignition of the reactants occur substantially before piston 13 has reached TDC so that the bulk of the reactants is in chamber 16 and only a minority is in chamber 17. This is because the catalyst, having a very high surface area-to-volume ratio, will quench combustion, thereby preventing that portion of the reactants in chamber 17 from being converted into initial product (syngas).

Figure 2:
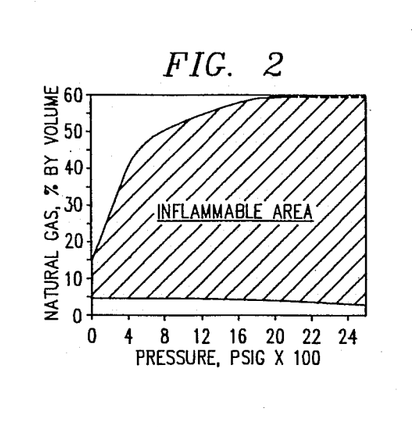
FIG. 2 is a plot of the limits of inflammability of mixtures of air and natural gas (methane) versus pressure.

Although it is desired that the reactants be ignited substantially before piston 13 has reached TDC, the reactants must nevertheless be compressed sufficiently at the time of ignition for combustion to be possible. See FIG. 2 which shows the pressures above which rich natural gas-air mixtures must be in order to be inflammable (combustible). The richness of the mixture of reactants, the degree of reactant pressure supercharge and preheat upon intake, and the relative volumes of chambers 16 and 17 will determine the earliest point at which the reactants may be successfully ignited. So that the reaction has as long as possible to proceed, and so that as much of the reactants are in chamber 16 as possible, it is desired to ignite the reactants as soon as the required pressure has been attained in chamber 16. This may entail initiating ignition of the mixture as much as 90° or more before TDC to as little as 5° or less before TDC.

Following successful ignition, the reactants are converted into initial product; e.g., syngas in the case of methane and air reactants. After ignition, piston 13 continues to move towards TDC to force the newly formed initial product from chamber 16 into chamber 17. At TDC (FIG. 1D), virtually all gases have been forced into chamber 17. At this point, the pressure within the engine-reactor is at its highest. The relative volume of chamber 17 directly affects the peak pressure.

Figure 1D:
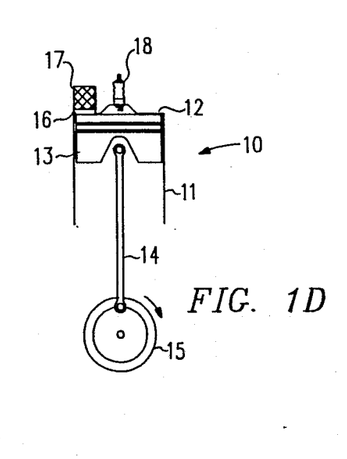

The combustion of the reactants, methane and oxygen (air), produces an initial product of syngas; i.e., carbon monoxide and hydrogen. The stable molecular bonds of the methane molecule are broken, forming very chemically active syngas. The catalyst in chamber 17 is selected to act upon the chemically active syngas to synthesize the desired end product. For example, a copper-zinc oxide catalyst may be selected to synthesize methanol from the syngas as is well understood. The initial product, syngas, formed in FIG. 1C, is forced into chamber 17 containing the catalyst (FIG. 1D). While in chamber 17, the initial product is acted upon by the catalyst, forming the end product, e.g., methanol. The movement of piston 13 from BDC to TDC with intake valve 19 and exhaust valve 20 closed and including the ignition of the reactants by the sparkplug 18 is defined to be the "conversion" stroke.

Figure 1E:
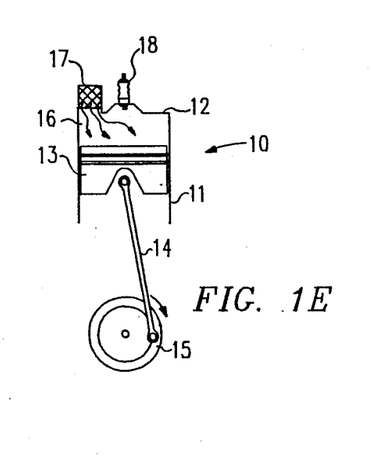

As crankshaft 15 continues to rotate, piston 13 moves from TDC towards BDC. The gas confined in the catalytic chamber 17 which contains the end product flows back into chamber 16 where it continues to expand, doing work, and cooling in the process. This expansion and cooling of the gas containing the end product is important in several ways. First, the catalytic processes in which end products are synthesized from initial products are very often exothermic. Provision for adequately cooling the catalyst in conventional catalytic reactors is a major concern. Often the feedstock is diluted with inert gases to act as thermal buffers, absorbing the released heat of reaction. Alternately, feedstock is passed through a series of catalytic reactors with intermediate heat exchangers to remove the heat of reaction.

In the present invention, the heat of reaction is removed by conversion to mechanical energy, which is the function of the thermodynamic power cycle. The work thus recovered from the reaction may be used to compress the next charge of reactants. In addition to removing the heat of reaction, the rapid expansion and cooling of the end product will quench the reaction, thus retarding undesirable product formation/reverse reactions as chemical equilibriums change. The movement of piston 13 from TDC to BDC with intake valve 19 and exhaust valve 20 closed is defined to be the "expansion" stroke.

Figure 1F:
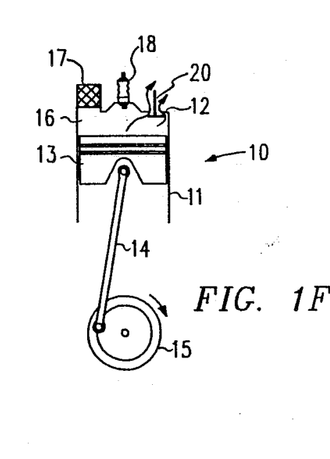

As the crankshaft 15 rotates through BDC, exhaust valve 20 opens (FIG. 1F). As piston 13 moves from BDC towards TDC, the cooled gas containing the end product is expelled from chamber 16 and from the engine-reactor 10. The movement of piston 13 from BDC to TDC with exhaust valve 20 open is defined to be the "exhaust" stroke. At TDC, the exhaust valve 20 closes, the intake valve 19 opens, and the entire process is repeated.

The embodiment of the present invention illustrated in FIGS. 1A–1F is a simple modification of an internal combustion engine operating on the Otto cycle (spark ignition). It has, however, certain design constraints. That is, for the premixed reactants to combust in a self-sustaining reaction to form the initial product, the reactants must be compressed to certain conditions of pressure and temperature (see FIG. 2). At the time of ignition, the volume of chamber 16 should be large compared to the volume of chamber 17 to maximize conversion of the reactants to the initial product. At TDC during catalytic synthesis, the volume of chamber 17 should be large compared to the volume of chamber 16 to maximize conversion of the initial product to end product. Simultaneously satisfying these criteria necessarily requires that the pressures near TDC of the conversion/expansion strokes be high.

Figure 3A:
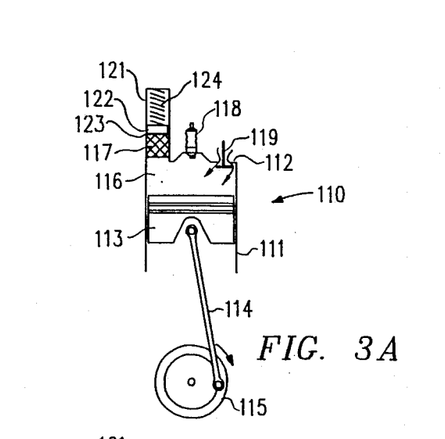
FIGS. 3A-3F are schematical, sectional views of another embodiment of an integrated engine-reactor used to carry out the present invention also based on the four-stroke Otto cycle.
Figure 3B:
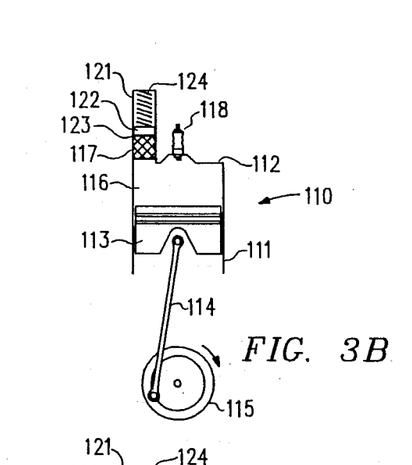
Figure 3C:
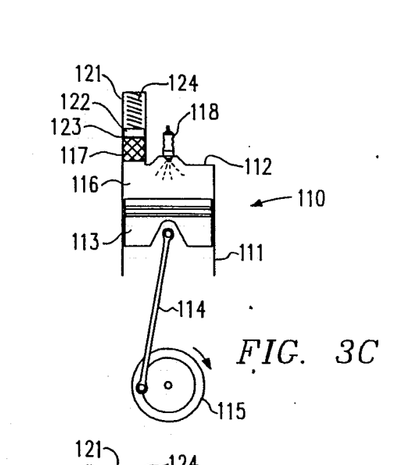
Figure 3D:
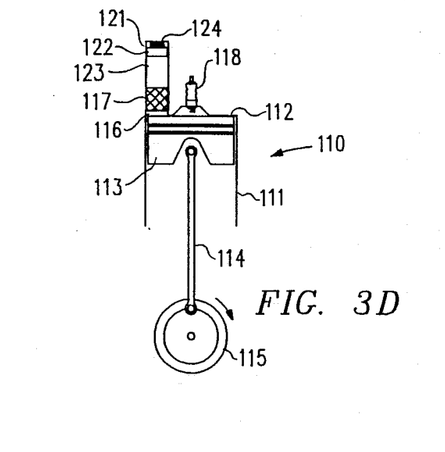
Figure 3E:
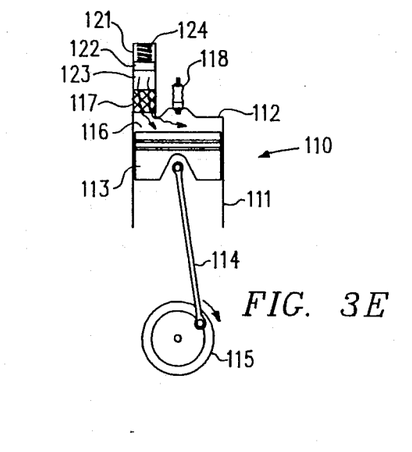
Figure 3F:
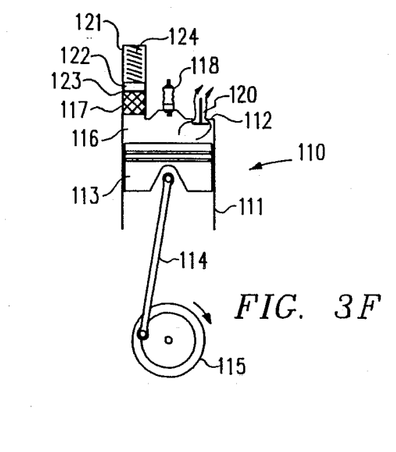

FIGS. 3A–3F illustrate another embodiment of the present invention as it is carried out in a modified cylinder four-stroke Otto engine 110, which avoids the necessary high pressures associated with the embodiment described above. Engine 110 has a cylinder 111 fitted with a modified head 112. Piston 113, having rod 114 connected to crankshaft 115, is slidably positioned in cylinder 111. The position of piston 113 within the cylinder 111 defines a first or combustion chamber 116 of variable volume. Head 112 includes a housing thereon that has a second or catalysis chamber 117 of fixed volume and a cylinder 121 therein. Cylinders 116 and 121 are fluidly connected through catalysis chamber 117 which, in turn, contains a catalyst having a large surface area; preferably the catalyst is supported on a porous ceramic matrix. Cylinder 121 is fitted with piston 122 which is slidable within cylinder 121. The position of piston 122 thus defines a third chamber 123 between piston 122 and the catalyst of second chamber 117 and is of variable volume. Piston 122 in cylinder 121 is normally biased towards chamber 117 by the action of spring 124, which may be a mechanical spring, as illustrated, a gas spring (pressure), or a rod and crankshaft arrangement, as will be understood in the art. Head 112 is equipped with a sparkplug 118, an intake valve 119 (FIG. 3A), and an exhaust valve 120 (FIG. 3F).

The operation of the embodiment of the present invention illustrated in FIGS. 3A–3F is similar to that of the embodiment previously discussed. As shown in FIG. 3A, the cycle begins with the intake stroke wherein piston 113 moves from TDC towards BDC in cylinder 111 to admit a charge of reactants (e.g., methane and air) into chamber 116 through open intake valve 19. At BDC, intake valve 119 closes.

As crankshaft 115 continues to rotate, piston 113 moves from BDC towards TDC in cylinder 111, compressing the charge of reactants within chamber 116 (FIG. 38). As the reactants within chamber 116 are compressed, a portion is forced from chamber 116 into chambers 117 and 123. The gas pressure in chamber 123 exerts a force on piston 122 which acts to overcome the force exerted by spring 124. Prior to ignition of the reactants, the pressure of the compressed reactants is not yet sufficient to overcome the preset force exerted on piston 122 by spring 124. Thus, piston 122 remains against chamber 117, and chamber 123 has virtually no volume.

With further compression of the reactants, conditions of pressure and temperature within chamber 116 are attained at which ignition of the reactants will result in a self-sustaining combustion causing the formation of initial product, syngas. When these conditions are attained, the reactants within chamber 116 are ignited by the action of sparkplug 118 (FIG. 3C). It is preferred that ignition of the reactants occur substantially before piston 113 reaches TDC within cylinder 111 such that the volume of reactants contained in chamber 116 is large compared to the volume of reactants contained in chambers 117 and 123. The heat released by the combustion of the reactants during formation of the initial product, syngas, causes the pressure within chambers 116, 117, and 123 to rapidly increase.

As crankshaft 115 contines to rotate, the initial product within the chambers are further compressed. Soon after the point of ignition, the pressure increases sufficiently so that the force exerted by the gas on piston 122 is sufficient to overcome the preset force exerted by spring 124. With any further increase in pressure, piston 122 will retract in cylinder 121, thus increasing the volume of third chamber 123 and compressing spring 124. The amount of movement of piston 122 and hence the amount of volume increase of chamber 123 per unit increase of gas pressure is determined by the spring constant of spring 124 which is selected accordingly. The result is that the volume decrease of chamber 116 as piston 113 moves towards TDC in cylinder 111 is offset by the volume increase in chamber 123 as piston 122 retracts in cylinder 121 compressing spring 124. Thus, without a significant increase in pressure, gases in chamber 116 are transferred into third chamber 123 and, in the process, pass through second chamber 117 and the catalyst therein (FIG. 3D), thereby converting a portion of the initial product (syngas) into end product (methanol).

As crankshaft 115 continues to rotate, piston 113 moves from TDC towards BDC in cylinder 111. As the volume of chamber 116 increases, the gas pressure begins to drop, lessening the force on piston 122. Spring 124 begins to extend thereby pushing piston 122 towards chamber 117 which decreases the volume of chamber 123. The gases in chamber 123 are forced back through the catalyst in chamber 117 and into chamber 116 by piston 122 (FIG. 3E). As the gases pass through the catalyst, additional initial product not converted during the first pass is converted into end product. In chamber 116, the gas containing the end product expands as piston 113 continues towards BDC. As the gas expands, it does work to cool the end product.

At BDC exhaust valve 120 opens (FIG. 3F). As crankshaft 115 continues to rotate, piston 113 moves back towards TDC, expelling the cooled gas containing the end product from chamber 116. At TDC, the exhaust valve 120 closes, intake valve 119 opens, and the process is repeated.

Figure 4A:
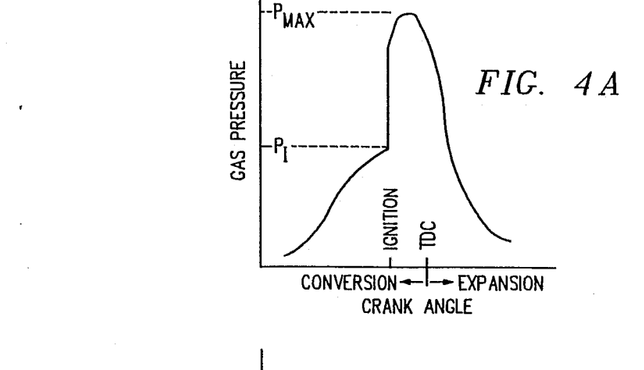
FIGS. 4A and 4B are plots of cylinder pressure versus crank angle for the two embodiments of an integrated engine-reactor shown in FIGS. 1A-1F and FIGS. 3A-3F.
Figure 4B:
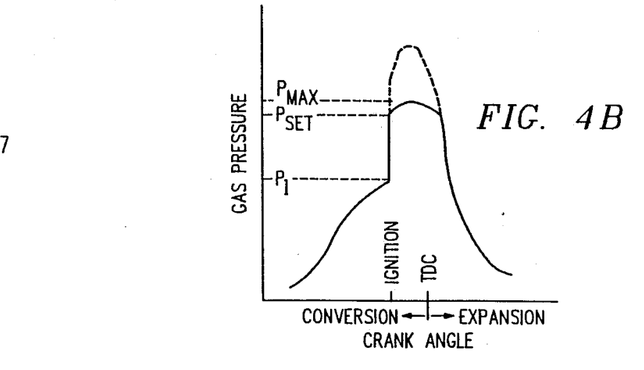

The differences between the embodiment depicted in FIGS. 3A-3F and the embodiment depicted in FIGS. 1A-1F is illustrated in the graphs of FIGS. 4A and 4B, which depict gas pressure within the respective engine-reactors during the conversion and expansion strokes. In FIG. 4A (corresponding to FIGS. 1A-1F), during the conversion stroke, the cylinder pressure increases as crank angle moves toward TDC. Significantly before TDC, the pressure ($P_I$) has increased sufficiently that the reactants are able to sustain combustion. Soon thereafter, the reactants are ignited by the action of the sparkplug. The heat released by the combustion causes a rapid increase in pressure. As the crank angle continues to move towards TDC, the pressure increases even further, until, at TDC, it reaches the maximum pressure ($P_{MAX}$) As the crank angle moves away from TDC during the expansion stroke, the gas pressure decreases rapidly.

In FIG. 4B (corresponding to FIGS. 3A-3F), the gas pressure history during the conversion stroke is seen to be identical to that of FIG. 4A up through the point of ignition of the reactants. Following ignition, the gas pressure rises rapidly until the pressure is sufficient to overcome the present force ($P_{SET}$) of spring 24 acting on piston 22. Further heat release or advancement of the crank angle towards TDC serves to increase the volume of chamber 123 rather than greatly increasing gas pressures. As crank angle moves towards TDC, gas pressure increases somewhat due to the spring constant of spring 124. However, as seen in FIG. 4B, the maximum gas pressure at TDC is greatly decreased relative to FIG. 4A. This greatly facilitates design of the engine-reactor while allowing the criteria for efficient initial product generation and end product synthesis to be met.

FIGS. 1A-1F and FIGS. 3A-3F illustrate two embodiments of the present invention based on the Otto thermodynamic cycle. The Otto cycle was chosen because engines based on this cycle are the most common, e.g., the standard automobile internal combustion engine. It is to be understood that the present invention is not to be limited to variations based on the Otto cycle, however, and is adaptable to all thermodynamic power cycles, e.g., the Diesel cycle, Brayton cycle, Ericsson cycle, and Stirling cycle.

To illustrate adaptation of the present invention to cycles other than the Otto cycle, reference is now made to FIGS. 5A-5F which illustrate the present invention as carried out in a modified Stirling cycle engine. Stirling engines are particularly well suited for use in the present invention. Stirling engines are usually closed-cycle, external combustion engines with an internal working fluid (gas) oscillating between heated and cooled chambers that are connected through a passage containing a thermal regenerator. The thermal regenerator is a porous medium that alternately absorbs and give up heat as the working gas passes back and forth therethrough. The regenerator may be made of screen material or may be of a porous ceramic of the type commonly used as a support matrix for known catalytic materials. For a more complete description of Stirling engines and their operations, see "Principles and Applications of Stirling Engines," West, Van Nostrand Reinhold Co., Inc., New York City, N.Y., 1986.

The modified Stirling engine 210 shown in FIGS. 5A-5F has cylinders 211 and 221 fitted with cylinder heads 212 and 229. Piston 213, having rod 214 connected to crankshaft 215, is slidably positioned in cylinder 211. Piston 222, having rod 225 connected to crankshaft 226, is slidably positioned in cylinder 221. The position of piston 213 within the cylinder 211 defines a first or combustion chamber 216 of variable volume. The position of piston 222 within cylinder 221 defines a third or expansion chamber 223 of variable volume. A second or catalysis chamber 217 of fixed volume containing a catalyst is interposed between chambers 216 and 223. Interposed between chambers 216 and 217 is outlet valve 227; interposed between chambers 217 and 223 is inlet valve 228. Valves 227 and 228 may be cam-operated as should be understood in the art. Head 212 is equipped with a sparkplug 218 and intake valve 219. Head 229 is equipped with exhaust valve 220. Both intake valve 219 and exhaust valve 220 may be cam-operated as should be understood in the art.

As shown in FIG. 5A-5F, the engine-reactor 210 has several significant modifications compared to usual Stirling cycle engines. Engine-reactor 210 is an open-cycle arrangement: (gas enters and leaves) while Stirling cycle engines are usually closedcycle. The engine-reactor 210 is an internal combustion device while Stirling cycle engines are usually external combustion engines because they are usually closed-cycle (no way to get fuel in and exhaust out). However, if configured as open-cycle engines, a Stirling-cycle engine may also be configured as an open-cycle, internal-combustion device. Chamber 217 which in the Stirling engine would be filled with an inert regenerative heat exchanger material, contains a catalyst in the present invention which promotes a chemical reaction which often involves the liberation of heat.

Figure 5A:
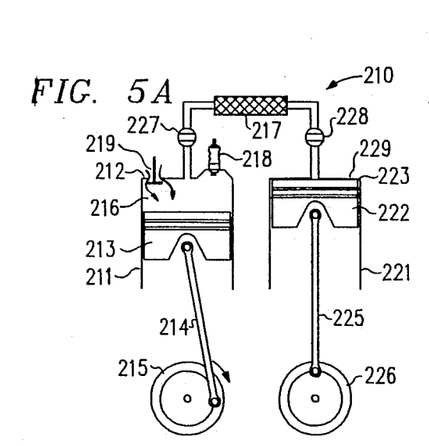
FIGS. 5A-5F are schematical, sectional views of yet another embodiment of an integrated engine-reactor used to carry out the present invention based on the Stirling cycle.

As shown in FIG. 5A, piston 213 has just passed top dead center (TDC) and is moving downward in cylinder 211 towards bottom dead center (BDC). During this action, intake valve 219 is open and outlet valve 227 is closed, allowing a charge of reactants to be drawn into first chamber 216. The movement of piston 213 from TDC to BDC in cylinder 211 with intake valve 219 open and outlet valve 227 closed is defined to be the "intake" stroke.

Figure 5B:
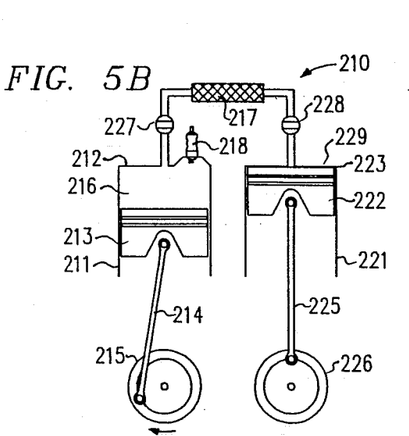
Figure 5C:
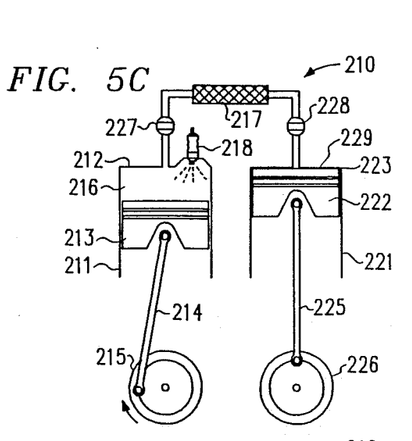

At BDC of the intake stroke, intake valve 219 closes and crankshaft 215 continues to rotate to move piston 213 upward in cylinder 211 from BDC towards TDC thereby compressing the reactants (FIG. 5B). The compressed reactants are ignited by sparkplug 18 substantially before piston 213 has reached TDC in cylinder 211 (FIG. 5C). This combustion forms the initial product, e.g., syngas.

Figure 5D:
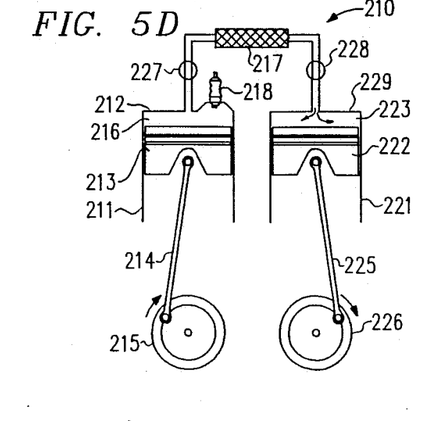

Soon after ignition, outlet valve 227 and inlet valve 228 open. As piston 213 moves towards TDC in cylinder 211, piston 222 moves from TDC in cylinder 221 towards BDC (FIG. 5D). Thus, initial product in chamber 216 is forced through the catalyst in chamber 217 where it is acted upon to become end product. The gas containing the end product then flows into third chamber 223. The process of transferring the gas from first chamber 216 to third chamber 223 is a constant volume process. Any gas pressure increase is due only to the heating of the gas by the exothermic synthesis reaction or due to the molecular change effected by the catalyst. The movement of piston 213 from BDC to TDC in cylinder 211 while intake valve 219 is closed is defined to be the "conversion" stroke.

Figure 5E:
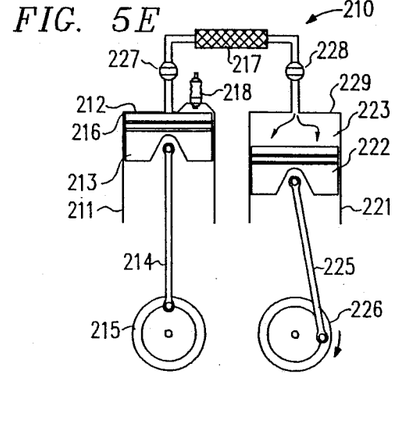

When piston 213 reaches TDC in cylinder 211 on the conversion stroke, outlet valve 227 and inlet valve 228 close (FIG. 5E). As piston 222 continues to move toward BDC in cylinder 221, the gas containing the end product in chamber 223 expands, doing work, thereby cooling the end product. The movement of piston 222 from TDC to BDC in cylinder 221 with exhaust valve 220 closed is defined to the "expansion" stroke.

Figure 5F:
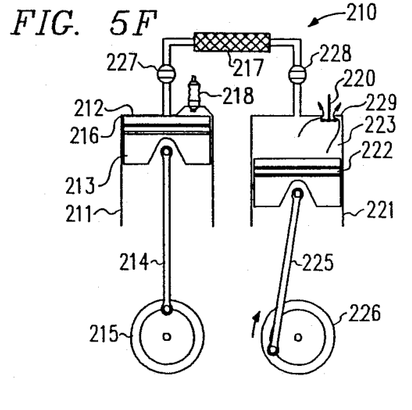

When piston 222 reaches BDC in cylinder 221, exhaust valve 220 opens (FIG. 5F). As piston 222 moves back toward TDC in cylinder 221, the gas which contains the end product is exhausted from chamber 223 and the engine-reactor 210. Movement of piston 222 in cylinder 221 from BDC to TDC with exhaust valve 220 open is defined to be the "exhaust" stroke.

In operation, both cylinders 211, 221 are operating simultaneously. Cylinder 211 performed the intake and compression strokes while cylinder 221 performed the expansion and exhaust strokes. Cylinder 211 performs the intake stroke "simultaneously" with cylinder 221 performing an expansion stroke and cylinder 211 performs the compression stroke "simultaneously" with cylinder 221 performing the exhaust stroke. The only requirement is that there be a slight "phase difference" between the operation of the two, i.e., that cylinder 221 begins the expansion stroke slightly before cylinder 211 completes the compression stroke in order to accomplish transfer of gas from first chamber 216 through second chamber 217 and into third chamber 223 in the prescribed constantvolume manner.

The operation of cylinder 211 is coordinated with the operation of cylinder 221 only to achieve a
of gases from chamber 216 to chamber 223. This is to avoid the high pressures associated with the embodiment illustrated in FIGS. 1A-1F. The high pressures arise in the embodiment shown in FIGS. 1A-1F from the fact that the volume of chamber 17 is small. However, in the embodiment illustrated in FIGS. 5A-5F, there is no longer such a constraint to minimize the volume of chamber 217. In fact, there are advantages to making the volume of chamber 217 relatively large: (1) a large volume in chamber 217 increases the residence time of the initial product in the catalysis chamber, facilitating a more complete conversion of initial product to end product; and (2) there is no need to coordinate the operation of the two cylinders to achieve a constantvolume transfer of gas, as high pressures will not result. Thus the operation of the two cylinders may be decoupled altogether. The operation of outlet valve 227 need only be coordinated with the movements of piston 213, and the operation of inlet valve 228 need only be coordinated with the operation of piston 222. The operations of valves 27 and 28 do not need to be coordinated with each other.

Further, in the embodiment shown in FIGS. 5A-5F, the intake and conversion strokes are carried out in a cylinder different than the one in which the expansion and exhaust strokes are carried out. Thus the cylinders may be optimized to carry out their respective tasks. That is, (1) the compression ratio can easily be different than the expansion ratio; (2) the displacement of the expansion cylinder can be greater than the displacement of the compression cylinder, thus accommodating volumetric changes due to temperature and molecular changes; and (3) the expansion cylinder may be operated at different speeds (rpm) than the compression cylinder if, for example, very rapid quenching is desired. Since chamber 217 is also isolated from the cylinders by valves 227 and 228, by the proper actuation of these valves, the pressure within chamber 217 can be maintained at a relatively constant level to avoid large pressure swings. Such pressure swings may be stressful to certain catalysts and catalyst supports thereby shortening their life and increasing attrition.

The preceding examples of embodiments of the present invention, although based on machinery developed for two different thermodynamic power cycles, all employed reciprocating machinery. It is to be understood that the present invention is not limited to reciprocating machinery, but is also applicable to rotating machinery. See co-pending U.S. patent application Ser. No. 07/116185, filed concurrently herewith. To illustrate such an embodiment of the present invention utilizing rotating machinery, reference is now made to FIG. 6, which shows an engine-reactor 310 based on the Brayton cycle. Engines for power based on the Brayton cycle are common and known commonly as gas turbines, combustion turbines, and jet engines.

Figure 6:
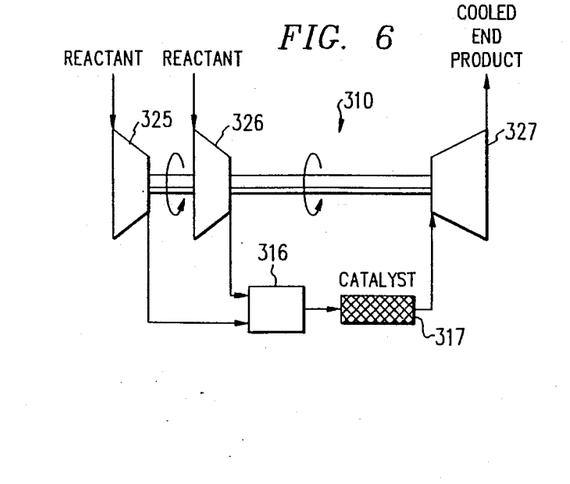
FIG. 6 is a schematic of still another embodiment of an integrated engine-reactor used to carry out the present invention based on the Brayton cycle.

Engine-reactor 310 in FIG. 6 is comprised of compressors 325 and 326 (axial or centrifugal), a combustor or first chamber 316, a catalysis chamber 317, and an expansion turbine 327 (axial or centrifugal). In the previous embodiments of the present invention, the reactants admitted into the engine-reactors were mixed prior to compression. As illustrated in FIG. 6, the reactants in the Braytonbased engine-reactor need not be mixed prior to compression, although it is to be understood that they could be, if desired.

A first reactant, e.g., methane, is fed to and is compressed in compressor 325. A second reactant, e.g., oxygen (air), is fed to and is compressed in compressor 326. After exiting their respective compressors, the reactants are introduced into the combustor or chamber 316 where they are ignited and react to form the initial product, e.g., syngas. The initial product then flows from chamber 316 into the catalysis chamber 317 where a suitable catalyst acts upon the initial product to generate a gas containing end product. Chamber 317 can be made of sufficient volume so to achieve the desired residence time. The hot, high-pressure gas containing end product exits chamber 317 and is introduced into expansion turbine 327, where the gas is expanded, doing work and cooling in the process. The cooled gas containing the end product is finally exhausted from the expansion turbine 327.

An advantage of rotating-based engine-reactors over reciprocating-based engine-reactors is that rotating machinery are generally able to achieve higher specific volumetric throughputs. Reciprocating machinery, however, are generally more economic at smaller scales and are generally able to achieve high pressures, if needed, more easily.

In all embodiments of the present invention, work was extracted from the synthesized end product as a means of cooling the gas and quenching the reactions. The extracted work may be used to compress the reactants. Depending on the relative amounts of reactants and on the heat released, by the synthesis reaction, if any, the integrated engine-reactor may produce an excess of mechanical energy or it may require the input of additional mechanical energy. It is to be understood that, regardless of the net export/import of mechanical energy, these devices are included as examples of the present invention.

In the examples discussed of embodiments of the present invention, natural gas (methane) and air (oxygen) are used as examples of reactants. It is to be understood that this invention is not limited to these reactants, but may include any reactants which will react in a combustion-like reaction. Furthermore, syngas (carbon monoxide and hydrogen) is used as the example of initial product formed within the engine-reactor but it should be understood that this invention is not limited to this initial product. Methanol synthesized from syngas over a copper-zinc oxide catalyst was described as an example of an end product formed within the engine-reactor but, again, it should be understood that the present invention is not limited to the formation of methanol from syngas via copper-zinc oxide catalysts, nor only to the formation of methanol from syngas. The catalytic formation of formaldehyde from syngas over a silver catalyst is an example of another end product which may be synthesized within an integrated engine-reactor. Further, the catalytic formation of higher hydrocarbons from syngas via any of the known Fischer-Tropsch catalysts is still another example of end products, which may be synthesized within an integrated engine-reactor.

In the above examples, the reactants admitted to the engine-reactor were premixed. It is to be understood that this invention is not limited to charges of premixed reactants. Mixing of the reactants together may first occur within the engine-reactor. In the above embodiments, examples of reactants admitted to the engine-reactor were binary mixtures (methane and oxygen), usually with a diluent (nitrogen). It is to be understood that this invention is not limited to binary mixtures of reactants. For example, a mixture of methane, oxygen (air), and water (liquid or gas) may be introduced into the engine-reactor to produce a hydrogen-rich product gas via first the generation of syngas (carbon monoxide and hydrogen). In this example, the third reactant, water, was added to alter the initial product compostion. Other reactants may be added which do not alter the initial product composition but rather accelerate the reaction. An example of such a reactant is formaldehyde which is well known to accelerate the combustion of methane. It may be desirable to add such promoters to accelerate reactions, thus gaining more complete reactions and/or improving throughputs. As such reactants which promote the desired reaction themselves take part in, and for the most part, are consumed by the reaction, they are not catalysts.

In conventional internal combustion engines operated for power, large quantities of heat are liberated via the highly exothermic (complete) combustion of fuel. A portion of the liberated heat is converted to mechanical energy, portion is lost as hot exhaust products, and the remainder is transferred to the engine and must be rejected to the environment via the cooling system. In contrast, in engine-reactors the reaction forming the initial product (e.g., partial combustion) may be only weakly exothermic. In order to maximize the completeness of reaction and to minimize deleterious effects such as quenching by the engine-reactor chamber walls, heat loss is to be minimized. Rather than providing for a cooling system, it may be desirable to insulate the engine-reactor to minimize the heat loss. Still further towards this end, it may be desirable to provide a system which heats the engine-reactor, further reducing heat transfer from the reactants, and minimizing quenching. As noted previously, it also may be desirable to preheat the reactants prior to their introduction into the engine-reactor.

In the above examples, only one catalyst is mentioned to generate one end product directly from an initial product. It should be further understood that the present invention is not limited to the use of only one catalyst at a time. A plurality of catalysts, either mixed together within one catalysis chamber or separated in a series of catalysis chambers, may be employed to synthesize intermediate product from the initial product and prior to the synthesis of the end product. An example of this would be to use a copper-zinc oxide catalyst to first synthesize methanol from a syngas initial product, and then to employ a silver catalyst to synthesize formaldehyde from the intermediate product methanol. Alternatively, a zeolite with a carbon monoxide reducing agent, e.g., Mobil's ZSM-5 catalyst, may be used to synthesize normally liquid hydrocarbons from the methanol intermediate product. The advantage of employing multiple catalysts and producing intermediate products is that a higher overall production of end product may thus be achieved.

In conventional catalysis, undesired reactions within the catalytic reactor may generate products which, over time, reduces the activity of the catalyst. An example of such a reaction which is common to catalysts forming products from carbon-based feedstock is the formation of coke, e.g., solid carbon. The coke forms a film or barrier on the surface of the catalyst which isolates the catalyst from the feedstock, thus causing a decrease in activity. It is common practice to regenerate the coked-up catalyst by passing hot air or steam through the catalyst bed to oxidize the coke. With the coke deposit removed, the catalyst is restored to its normal level of activity, and the catalytic reactor may be returned to service.

The configuration of the integrated engine-reactor greatly facilitates the removal of coke deposits from the synthesis catalyst(s). When catalyst regeneration is desired, the engine-reactor can be briefly operated "fuel-lean" in lieu of its normal "fuel-rich" mode. In the "fuel-lean" mode, the engine-reactor is operating under conditions more typical of engines operated for power production. The hot oxygen-containing exhaust thus produced will burn off the carbon deposits from the catalyst. If desired, steam or water may be injected into the engine-reactor prior to the catalyst to reduce exhaust temperatures during fuel-lean operation, and to aid in coke removal. Once the coke has been oxidized away, the engine-reactor can be returned to its normal "fuel-rich" mode of operation. The de-coking process can thus be done "on the fly" with the engine-reactor running.

What is claimed is:

1. An integrated engine-reactor for converting a reactant and an oxidizer to an end product comprising:

a first chamber therein, said first chamber comprises a cylinder in said engine-reactor having a reciprocating piston therein and a cylinder head thereon;

means for igniting said reactant and oxidizer in said first chamber to produce an initial product therein;

a second chamber in fluid communication with said first chamber to receive said initial product therefrom, said second chamber adapted to be filled with a catalytic material which upon contact with said initial product will catalytically synthesize said end product;

a third chamber in fluid communication with said second chamber adapted to receive said end product wherein said end product expands to thereby cool said end product; and means to exhaust said expanded end product from said engine-reactor.

2. The integrated engine-reactor of claim 1 wherein:
said first and third chambers comprise the same chamber in said engine-reactor.

3. The integrated engine-reactor of claim 2 wherein said second chamber comprises:
a chamber mounted on the cylinder head of said at least one cylinder and in fluid communication with said first chamber.

4. The integral engine-reactor of claim 1 wherein:
said second chamber comprises:
a chamber mounted on the cylinder head of said at least one cylinder and adapted to be filled with a catalytic material;
and wherein said third chamber comprises:
a chamber integral with and in fluid communication with said second chamber; and
a reciprocating piston slidably positioned within said third chamber.

5. The integral engine-reactor of claim 4 including:
means to normally bias said piston in said third chamber toward said second chamber.

6. The integral engine-reactor of claim 1 wherein said third chamber comprises:
a second cylinder in said engine-reactor.

* * * * *